July 9, 1963  W. L. FRANKHOUSER ETAL  3,097,293
METHOD OF METALS JOINING
Filed Dec. 12, 1958  11 Sheets-Sheet 1
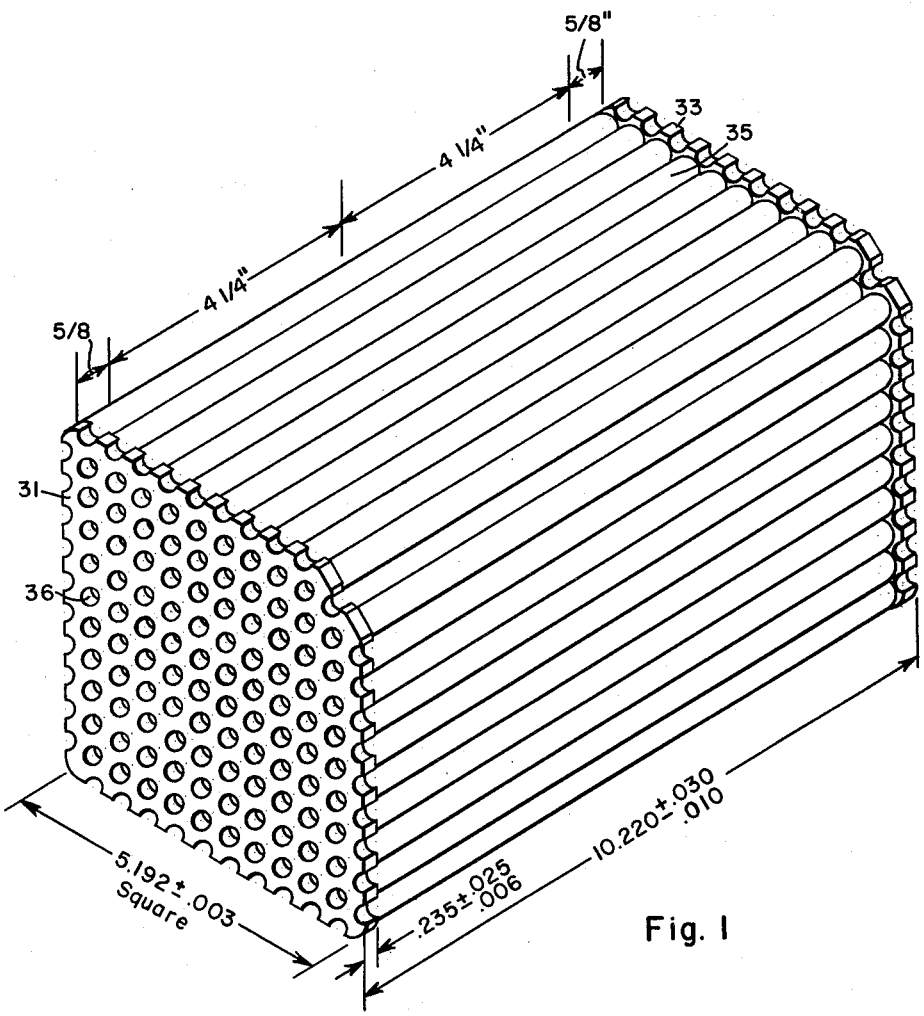
Fig. 1
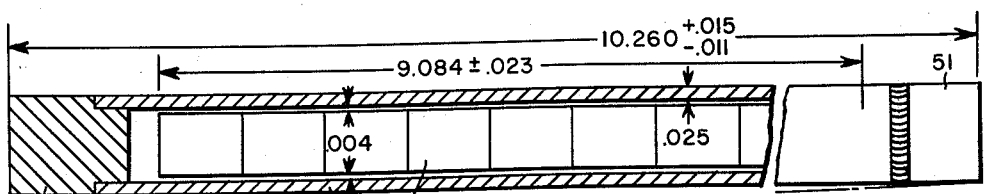
Fig. 3  Maximum Deflection From Horizontal
Limited To .006 Through 360° Rotation
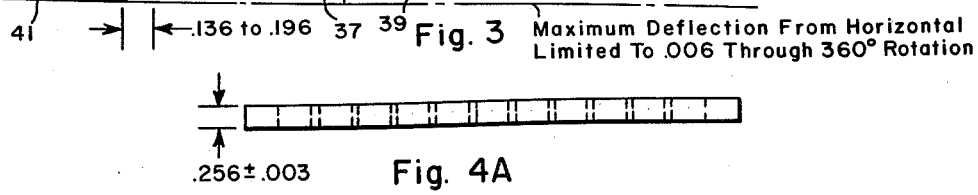
Fig. 4A July 9, 1963 W. L. FRANKHOUSER ETAL 3,097,293
METHOD OF METALS JOINING
Filed Dec. 12, 1958 11 Sheets-Sheet 2

July 9, 1963   W. L. FRANKHOUSER ETAL   3,097,293
METHOD OF METALS JOINING
Filed Dec. 12, 1958   11 Sheets-Sheet 5

July 9, 1963 W. L. FRANKHOUSER ETAL 3,097,293
METHOD OF METALS JOINING
Filed Dec. 12, 1958 11 Sheets-Sheet 7

Before Welding
After Welding
Shrinkage

Before Welding
After Welding
Shrinkage

Before Welding
After Welding
Shrinkage

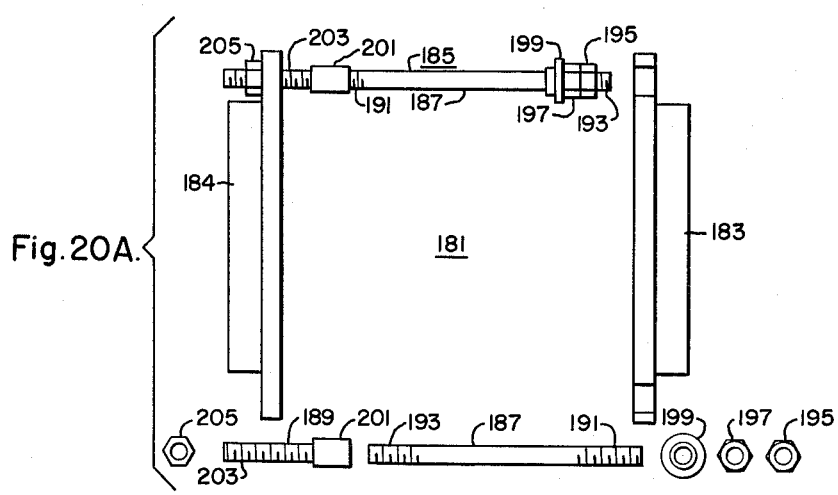
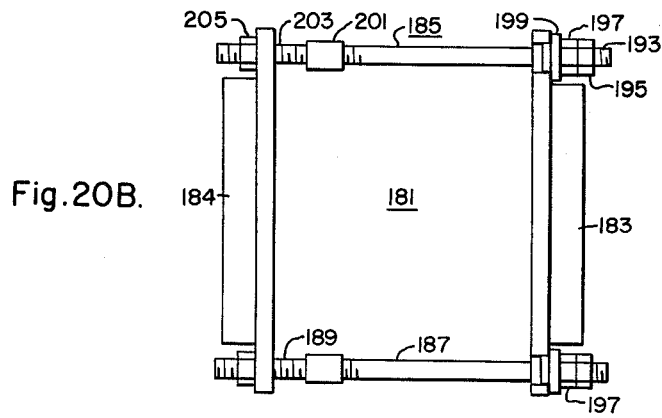
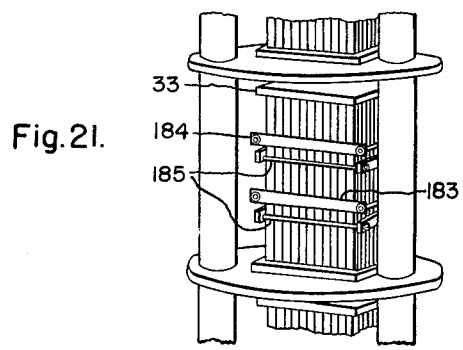

United States Patent Office 3,097,293
Patented July 9, 1963

3,097,293
METHOD OF METALS JOINING
William L. Frankhouser, Irwin, and John H. Eyler, Pittsburgh, Pa., assignors to Westinghouse Electric Corporation, East Pittsburgh, Pa., a corporation of Pennsylvania
Filed Dec. 12, 1958, Ser. No. 780,047
18 Claims. (Cl. 219—137)

This invention relates to the metals-joining art and has particular relationship to precision welding.

In the pressurized-water reactor (PWR) now in use in the nuclear industry, the heat exchange within the reactor takes place by passing water at a high temperature (of the order of 600° F.) and at a high pressure (of the order of 2,000 pounds per square inch) over a stack of fuel elements. The spacings between these elements and the spacings between the outer of these elements and their container must be precisely uniform; any substantial non-uniformity results in overheating at the points where a pair of elements or elements and the container are spaced both the shortest or the longest distances and in the development of hot spots which severely damage the reactor.

It is an object of this invention to provide a method for producing a nuclear stack in which the spacing of the fuel elements is precisely uniform.

More generally, it is an object of this invention to provide a method of precision welding for forming a plurality of elemental units into a stack in which the spacing between each element and its adjacent elements is precisely uniform throughout the length of the elements.

A nuclear stack which has advantageous properties is one made up of fuel rods held in a rigid bundle by end plates to which the rods are secured at their respective ends. The rods are hollow tubes, preferably of a low-neutron cross-section material, such as a zirconium alloy, filled with pellets of fissionable material, such as uranium oxide. The end plates are also composed of zirconium alloy and have holes between the rods through which the pressurized water flows.

The rods may be joined to the end plates by welding, but welding in accordance with the teachings of the prior art would produce distortion which would introduce non-uniformity in the spacings between the rods. It is then a specific object of this invention to provide a method of welding a stack consisting of rods joined to end plates while maintaining the spacing between each rod and its adjacent rod within narrow limits.

In accordance with this invention, the end plates are precisely surfaced and are provided with openings into which the ends of the rods are inserted so that the end surfaces of the rods are substantially flush with the surfaces of the end plates. Spacers, preferably of titanium-killed steel, are then inserted between the rods, and the ends of the rods are tacked to each end plate by fusion welding. The tacking is carried out for each end plate in a succession such as to minimize distortion. The successions for the end plates are homologous. Rods spaced around the periphery are first tacked and then rods in generally diagonal directions are tacked. A rigid rod end-plate assembly is thus formed. This assembly is then mounted in a welding chamber which is evacuated and filled with a highly purified inert gas as disclosed in an application Serial No. 500,354, filed April 11, 1955, to Lloyd B. Kramer et al., and now Patent No. 3,018,357. The rods are then fusion welded to each end plate in a succession such as to minimize distortion, the successions being homologous. Rods around the periphery of the stack and rods within the stack are welded alternately. The welding for each rod is carried out by moving a non-consumable welding electrode around the periphery of each rod with the welding arc within the latter periphery. The stack so formed is then clamped with a clamp of parts having a coefficient of expansion corresponding to that of the stack which includes zirconium-alloy rods and titanium-killed steel spacers and the clamped stack is annealed. This suppresses distortion near the longitudinal center of the stack (barrelling). Thereafter the spacers are dissolved by nitric acid with which zirconium does not react. The tacking and the welding of the rods to the end plates in the proper successions minimizes distortion so that a stack with uniform spacings as required is provided.

The novel features considered characteristic of this invention are disclosed generally above. The invention itself both as to its organization and as to its method of operation, together with additional objects and advantages thereof, will be understood from the following description of a specific embodiment taken in connection with the accompanying drawings, in which:

FIG. 1 is a view in perspective of a stack made in the practice of this invention;

FIG. 3 is a view partly in side elevation and partly in section showing a fuel rod of the stack shown in FIG. 1;

FIG. 4a is a view in side elevation of the end plate shown in FIG. 4;

FIG. 20 (A and B) shows the annealing clamp used on the stack in the practice of this invention; and FIG. 21 is a view in perspective showing a welded stack mounted for annealing.

Figure 8:
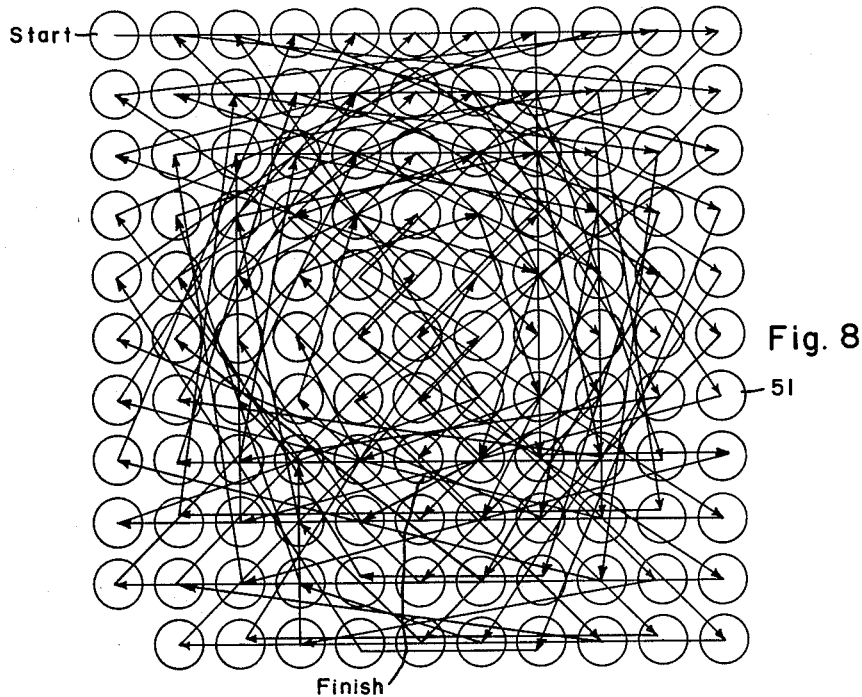
FIG. 8 is a diagram corresponding to FIG. 6 showing the pattern of the welding succession.

The stack shown in FIG. 1 is of generally square cross section including generally square end plates 31 and 33 and rods 35 joined to the end plates. The end plates 31 and 33 are provided with aligned openings 36 between the ends of the rods 35 through which pressurized water passes. Each of the rods 35 is a hollow tube 37 (FIG. 3) of zirconium alloy (for example, Zircaloy-2) in which pellets 39 of uranium oxide are stacked. The tube 37 is sealed at the ends by cylindrical plugs 41 of zirconium alloy welded to the ends. The welds securing the plugs must be resistant to corrosion by pressurized water and must be capable of preventing penetration of this water into the tube 37.

It is essential that the spacing between the rods 35 shall be maintained within narrow limits along the whole lengths of the rods 35. The dimensions and the tolerances shown in FIGS. 1 through 4a are typical. The dimensions and tolerances shown are those of a stack actually constructed which was found to operate satisfactorily at the Shippingport, Pa., power facility. This actual data is shown only for the purpose of aiding those skilled in the art in practicing this invention and not with the intention of limiting this invention in any way.

The stack shown in FIG. 1 is assembled by fusion welding each of the ends 51 of each of the rods 35 in its turn to the end plates 31 and 33. All rods 35 are welded to one end plate 31 or 33 and then they are welded to the other.

Figure 9:
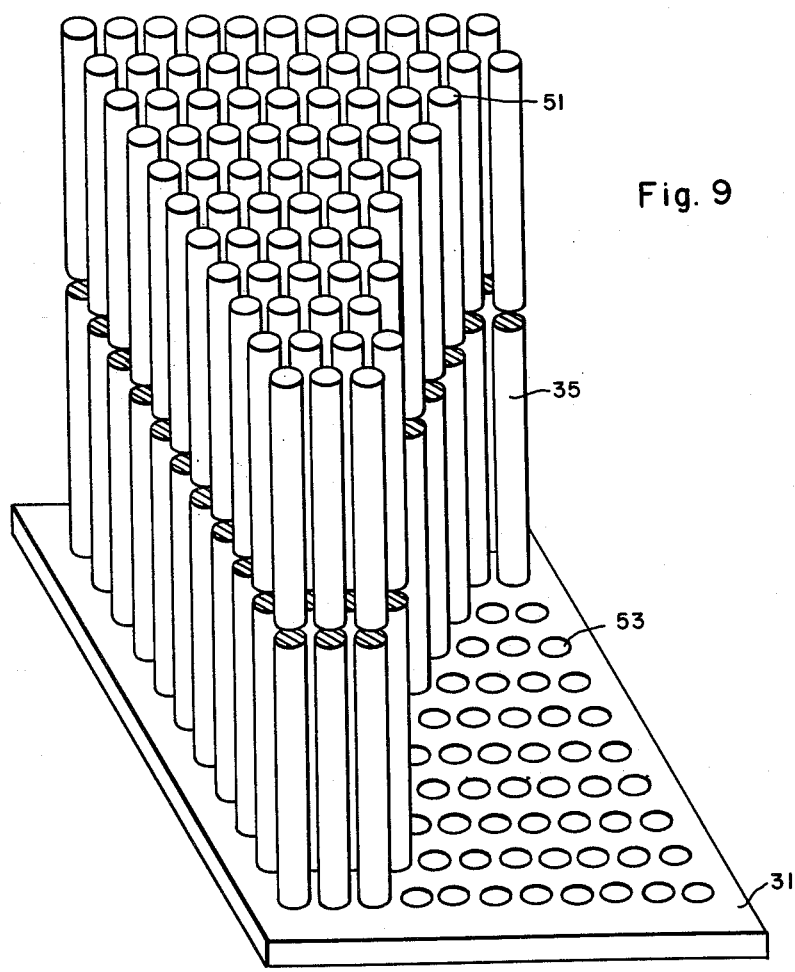
FIGS. 9, 10 and 11 are views in perspectvie showing the steps taken in preparing a rod end-plate assembly for forming into a stack in the practice of this invention.
Figure 10:
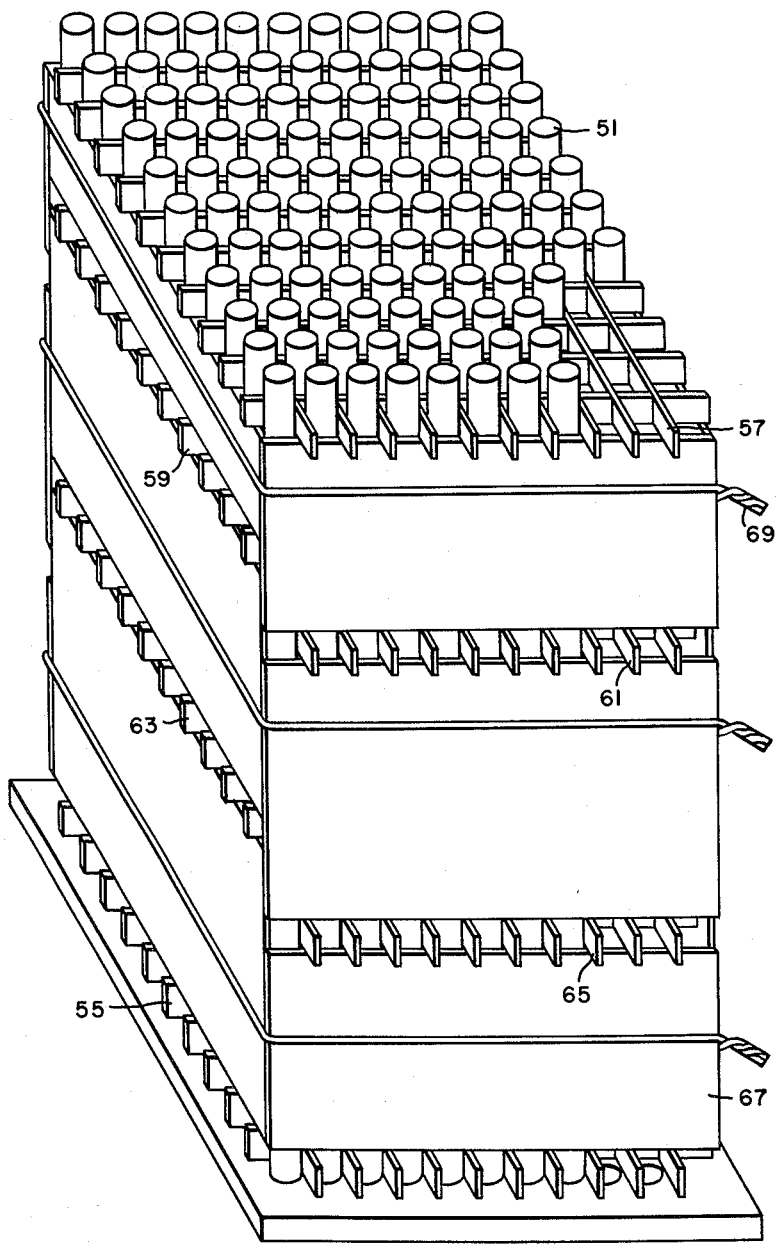
Figure 11:
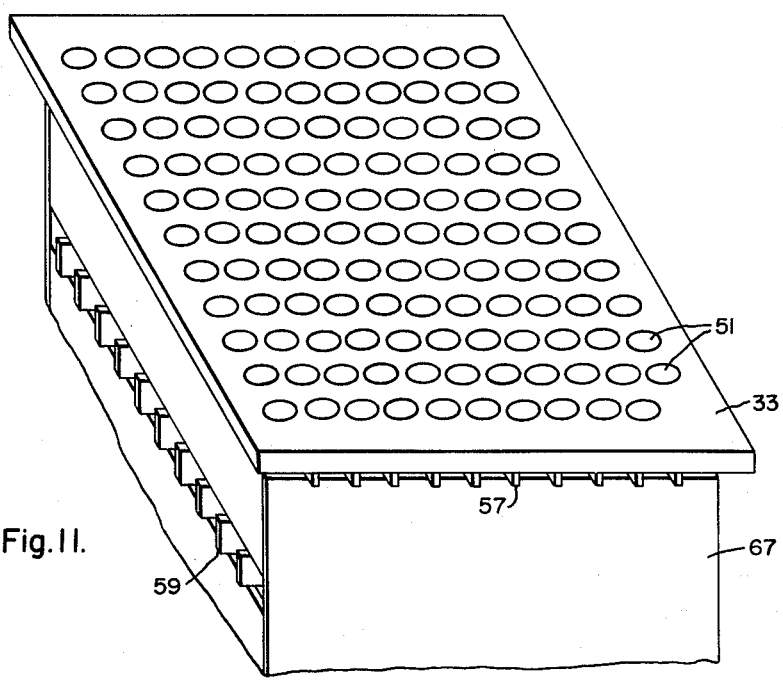

Preparatory to the welding operation, the rods 35 are inserted in openings 53 in end plate 31 as shown in FIG. 9. A square bundle of rods 35 is thus formed. Spacers of titanium-killed steel sold under the name Ti-Namel steel are then inserted between the rods near the plate 31, near the other end and between the plate 31 and the other end. The spacers at the plate 31 and at the opposite end are linked to form open box-like structures 55 and 57 (FIG. 10), respectively, which engage all rods 35 except those on the periphery on four sides and those on the periphery on three sides. The other spacers are in rows 59, 61, 63, 65, which engage alternately one side of each of the rods 35 and the side at right angles to the one side. The bundle is enclosed in side plates 67 which are secured by wire loops 69. The plates 67 extend between the arrays 55 through 65 of spacers and prevent them from sliding along the bundle. The end plate 33 is then engaged with the rods 35. The rods 35 and end plates 31 and 33 are so dimensioned that the surfaces 51 are substantially flush with the surfaces of the end plates (FIG. 11).

Figure 5:
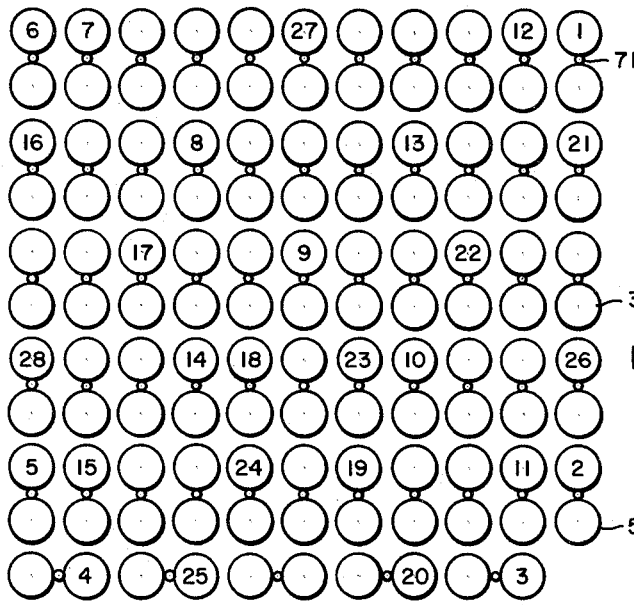
FIG. 5 is a diagram showing the tacking succession used in the practice of this invention.

The rods 35 are then tack-welded to each surface following the sequence shown in FIG. 5 for each surface. In each case the welds are produced by spot welding with a non-consumable electrode in a shield of inert gas. The parameters for the welding are presented in Table I below.

TABLE I

*Tack Welding Parameters*

Figure 7:
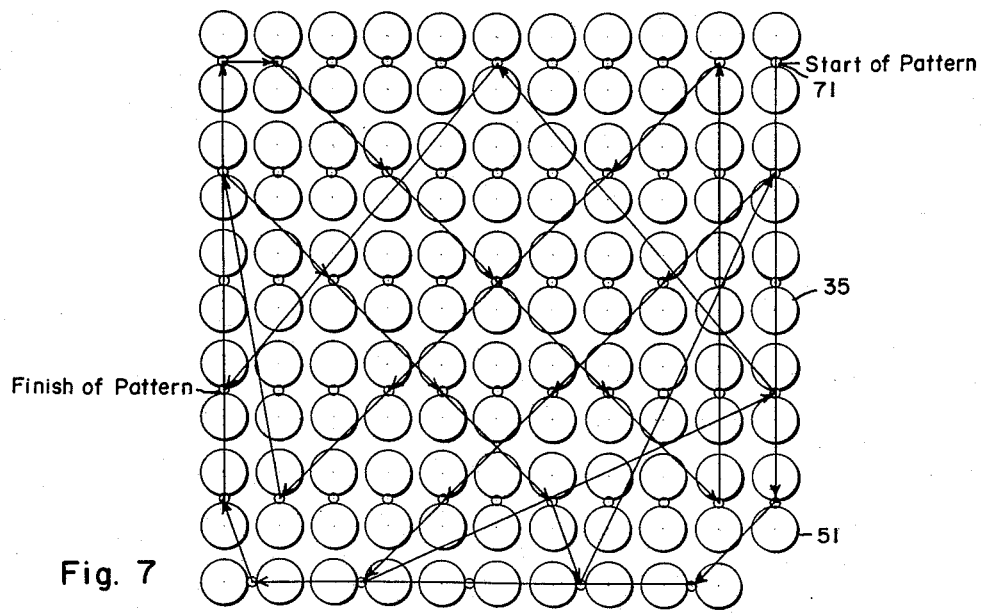
FIG. 7 is a diagram corresponding to FIG. 5 showing the pattern of the tacking succession.

Heliarc process, #6 Cup
Gas flow, 40 cu. ft./hr.±5 cu. ft./hr.
∼100 amps, arc current
∼15 volts, arc potential
∼1 second, time of each weld
Hi-frequency start
Maintain post weld flow of inert gas across tack weld for 10 seconds Each spot 71 is produced between the numbered rod 35 and an adjacent rod. The spots 71 are produced in the order of the numbers appearing in FIG. 5. The first spot 71 is produced between the upper right-hand rod 35 (referred to FIG. 5) and the one below it; the next between the next-to-the-lowest rod and the lowest on the right, and the others as indicated. The spots 71 at the numbered rods are produced first peripherally and then in generally diagonal directions, as shown in FIG. 7. With the spots 71 fused in the order indicated, a rigid rod end-plate assembly is produced with a minimum distortion. Other spots as indicated in FIG. 5 may be added in any order without increasing distortion The actual welding of the rod ends to the end plates 31 and 33 is now carried out in a chamber 81 (FIGS. 12 and 13) as taught by Kramer et al. application Serial No. 500,354 in a highly purified inert gas. The chamber 81 is of generally box-like form but has an inclined wall 83 in which there is a viewing port 85. In the wall 87 from which the wall 83 extends there are ports 89 into which rubberized gloves 91 are sealed. These gloves 91 serve to manipulate the parts in the chamber 81 without opening the chamber.

The chamber 81 also has side ports 93 and a rear port 95. Each of these ports is provided with a closure 97 for 93 and 99 for 95 which may be sealed gas-tight.

The work is inserted through the side ports 93. So that the ends 51 of the rods 35 may be properly positioned with respect to the welding electrode 101, the rigid rod-end-plate assembly produced by the tacking operation is mounted in a fixed predetermined position on a plate 103 which has a pedestal 104 and which may be related to the electrode 101. The assembly is positioned on the pedestal 104 and may be moved readily within the chamber 81 on roller bearing arrays 105 and 107 in the base of the chamber adjacent the indexing unit 113 on which the rod end-plate assembly is mounted for welding. The positioning of the assembly on the pedestal 104 is effected by a jig so that the centers of the end surfaces 51 may be precisely related to the welding electrode 101. The bundle assembly is held securely on the pedestal by clamps 121 and set screws 122 which extend from the base of plate 103 and engage the one or the other of the end plates 31 or 33 which is on the pedestal 104.

The indexing mechanism (FIG. 14) includes a base plate 131, a plate 133 for indexing in a direction generally perpendicular to the viewing port 85 and a plate 135 for indexing in a direction generally parallel to the viewing port 85. The base plate 131 includes an indexing bar 137 having a plurality of openings 139 precisely spaced so that each corresponds to the end surfaces 51 of the rods extending generally perpendicular to the port 85. The plate 131 also has two rows of vertical rollers 141 for guiding the plate 133. The plate 133 also has a bar 143 having openings 144 spaced so that each corresponds to the end surfaces 51 of the rods extending generally parallel to the port 85 and rollers 145 for guiding the plate 135. The plate 133 also has a projection 147, the sides of which engage the rollers 141 and are guided by them. The plate 133 carries rollers 148 by means of which it may be moved along the surface of plate 131. By the cooperation of the rollers 148 and 141 and the projection 147, the plate 133 may be readily moved in a direction parallel to the indexing bar 137. The plate 133 also has an indexing pin 149 which may be inserted in any opening 139 to hold the plate 133 in any position along the bar 137. The plate 135 has a projection 151 which cooperates with rollers 145 and rollers 150 to move and guide plate 135 parallel to the bar 143 and an indexing pin 153 which engages the openings 144 to set the plate 135 along plate 133. Plate 135 also has a groove 155 (FIG. 13) into which plate 103 may be slipped. Plate 103 is positioned precisely with respect to plate 135 by pins 157 (FIG. 13) at opposite diagonals of the bundle assembly. Thus, the end surfaces 51 of the rods 35 are positioned precisely with respect to electrode 101 in each of the index positions.

Figure 13:
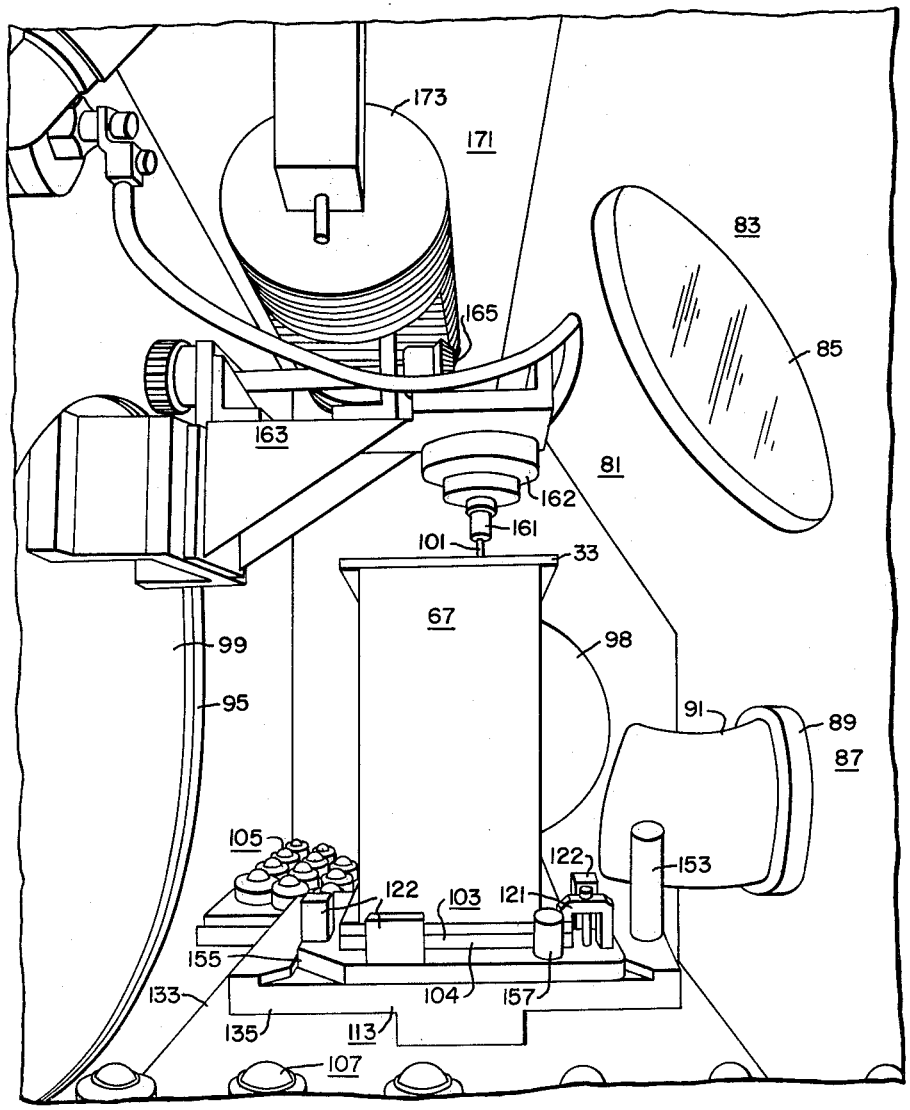
FIG. 13 is a view in perspective of the interior of the welding box shown in FIG. 12.
Figure 14:
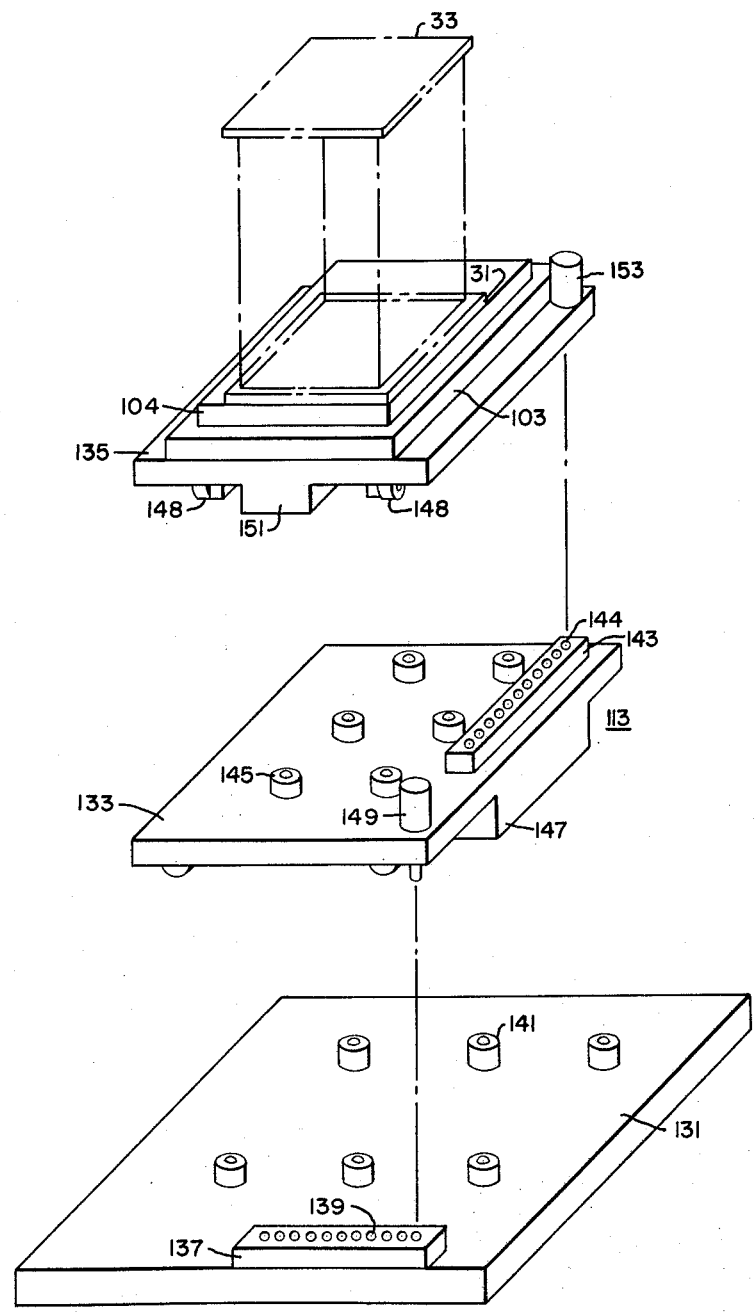
FIG. 14 is an exploded diagrammatic view showing the indexing mechanism used in the practice of this invention.
Figure 15:
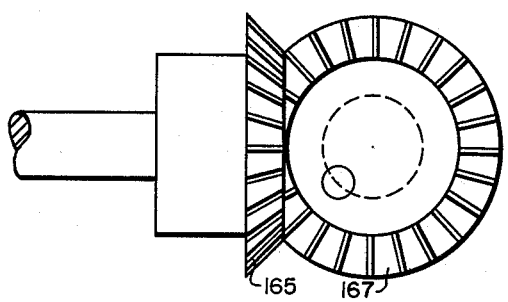
FIGS. 15 and 16 are fragmental views showing the welding-electrode drive used in the practice of this invention.
Figure 16:
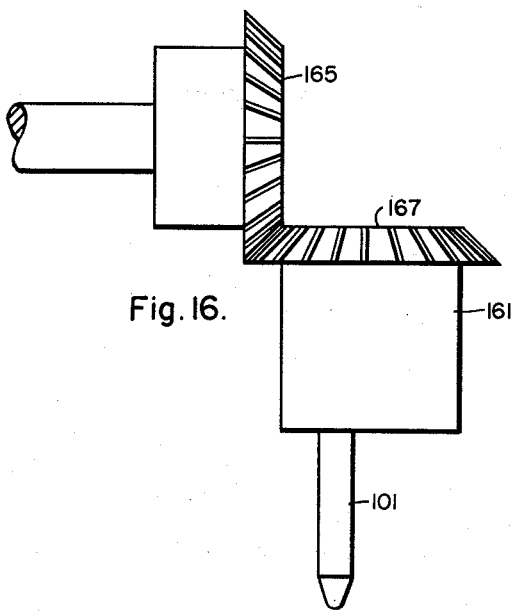

The electrode 101 is mounted eccentrically in a cylinder 161 (FIGS. 13, 15, 16) which is rotatable in bearings 162 suspended from a bracket 163 secured to the closure 99 of the rear port 95. During the welding of each rod end 51 to an end plate 31 or 33, the cylinder 161 is rotated by a motor (not shown) through gears 165 and 167 (FIGS. 13, 15, 16). The electrode 101 is positioned at a radius from the center of the cylinder 161 such that when the cylinder 161 is rotated the tip of the electrode 101 traces a circle just inside of the periphery of the end surface 51 of a rod 35.

The region of the arc is cooled by a cooling assembly 171. This assembly 171 includes a tube of highly heat-conducting material provided with fins 173. Within the tube there is a cooling coil (not shown) through which cooling water flows. Because of the cooling provided by the assembly 171, the rate at which rod end-plate assemblies may be welded is materially increased.

In the welding of the assemblies, the chamber 81 is exhausted and then filled with high-purity inert gas. The rod ends 51 at each end plate 31 and 33 in their turn are then welded to the end plate one by one following the sequence shown in FIGS. 6 and 8. The assembly is indexed to each welding position with the aid of the gloves 91. For each setting, the operator removes the pins 149 and 153 from the respective openings 139 and 144, sets the plates 133 and 135 in the proper positions and reinserts the pins. The welding parameters are shown in the following Table II.

TABLE II

*Welding Parameters*

| | |
|---|---|
| Arc voltage | 14 to 17 volts. |
| Arc current | 180±3 amperes. |
| Electrode rotation | 30 r.p.m. |
| Atmosphere | Helium pure. |
| Time: | |
| Peripheral rods (39 total) | 12½ sec.±½ sec. |
| Rods No. 6, 9, 12, 15 | 12½ sec.±½ sec. |
| Remaining rods (77 total) | 14 sec.±½ sec. |

Times above are to include a 3 sec. weld time at end of weld at approximately 20 amperes.

Welding time delay—20 to 30 seconds between welds.

Figure 17:
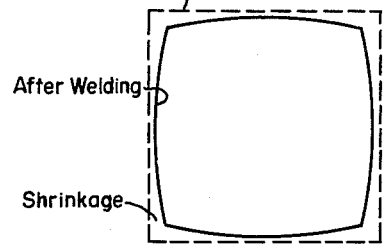
FIGS. 17, 18 and 19 are diagrammatic views of end plates, the former showing the extremes of different ways in which a rod end-plate bundle may be deformed by welding and the latter the desired means between these extremes.
Figure 18:
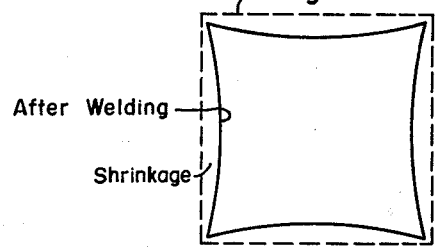

The sequence of the welding is such that rods 35 on the periphery of the assembly and inside the assembly are welded alternately. The welding following the proper sequence results in a stack having the general cross-sectional contour shown in FIG. 19. If the rods 35 are welded from the inside of the rod bundle outwadly, the contour is as shown in FIG. 18, and if they are welded from the periphery of the bundle inwardly, the contour is as shown in FIG. 17.

To reduce distortion further, the welded stacks are clamped and annealed in a vacuum. The clamps 181 shown in FIG. 20 in which (*a*) shows the parts and (*b*) shows the assembled unit, are so constructed that their expansion as they are heated to the annealing temperature and then cooled is about equal to the expansion of the stack along its cross section. Since the stack is composite consisting of zirconium rods 35, end plates 31 and 33, and steel spacers 55 through 65, the clamps 181 are also composite.

Each clamp 181 includes a pair of stepped crossbars 183 and 184 of stainless steel held in clamping engagement with the stack by composite clamping bolts 185. Each bolt 185 includes a rod 187 of molybdenum and a rod 189 of stainless steel. The molybdenum rod 187 has threads 191 and 193 at its ends. The thread 193 is engaged by nuts 195 and 197 which compress a flanged washer 199 against the bar 183. The stainless steel rod 189 has an internally threaded head 201, which accommodates the thread 191, and is threaded at its end 203 to accommodate a nut 205. The proper length of molybdenum rod 187 is set by nuts 195 and 197 and the stack is compressed between the plates 183 and 184 by tightening nut 205.

The stack is mounted for annealing as shown in FIG. 21. Four clamps clamp each stack. The clamps are displaced around the stack by 90°, the bars 183 and 184 being parallel to the adjacent intermediate spacer units 59, 61, 63 and 65, respectively. Thus, the upper clamp is arranged with the bars 183 and 184 parallel to the spacer strips 59, the next with bars 183 and 184 parallel to strips 61, the next with the bars parallel to strips 63 and the lowest with the bars parallel to strips 65.

After each stack is annealed, the spacers 55 through 65 are dissolved away with nitric acid and the stack is ready for use. Stacks made as disclosed herein have operated highly satisfactorily at the Shippingport facility.

The following summary may help in clarifying this invention.

This invention is essentially a process which can be used to weld rod or tube assemblies in precisely dimensioned arrays when the components themselves are joined only at the two ends, but also includes ancillary apparatus. In the specific practice of this invention, the end product is a fuel-stack assembly for a nuclear power unit, but the invention is not limited to such use.

Figure 2:
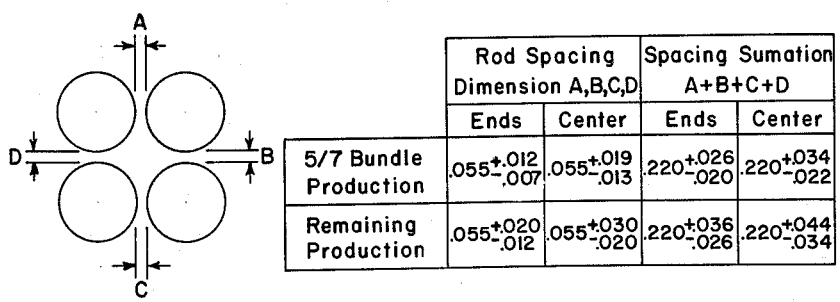
FIG. 2 is a diagram showing the tolerances to be maintained between internal rods in producing the stack shown in FIG. 1.

The invention was conceived to provide fully welded assemblies of fuel rods 35 which would meet all the dimensional tolerance requirements specified by the design. The most restrictive tolerances were those placed on the spacing between fuel rods 35. The fuel-rod spacing was held within these restricted tolerances to provide, as nearly as practicable, coolant channels of uniform thickness for passage of the primary loop coolant of the nuclear reactor. The tolerances are shown in FIGS. 1 and 2.

The use of Zircaloy-2 alloy for the fuel cladding (37, FIG. 3) in the rods 35 and for the material of the end plates 31 and 33 into which the rods are welded fits in well with the actual welding aplication. The properties of Zircaloy-2 alloy which favor low distortion and low residual stress in welding are its relatively low coefficient of linear thermal expansion, low modulus of elasticity, and the formation of the stable room temperature metallographic structural phase during normal postweld cooling. Reduction of residual stresses and elimination of the effects of welding distoration were two of the major problems which were encountered during the development of this process.

The added requirement that the Zircaloy-2 alloy be corrosion resistant to high temperature-high pressure water, introduced the additional problem that the welding be carried out in a controlled atmosphere chamber 81. Thus, the invention takes into account both the space and accessibility limitations of such welding.

The essential features of the process used to manufacture fuel assemblies are described in the following sections:

COMPONENT FABRICATION

Figure 4:
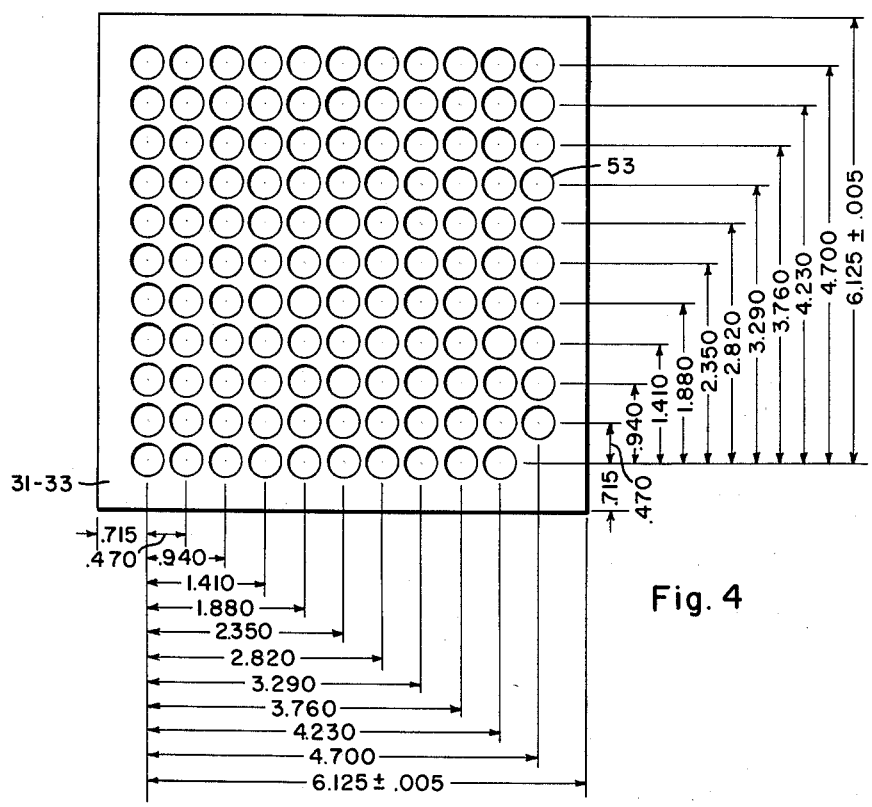
FIG. 4 is a plan view of an end plate of the stack shown in FIG. 1 showing the dimensions of this plate.

One of the major aids in achieving the precision required in dimensions is the control exerted over the dimensions of the components themselves. In the case of the end plates 31 and 33, the as-machined dimensions required and achieved are shown in FIG. 4. These were obtained primarily by the construction of adequate fixturing for the machining operations. The external dimensions of the fuel rods 35 are shown in FIG. 3. In this case the dimensions are held to the close tolerances through process control on prior manufacturing operations.

To provide the least possible space for movement in the as-tacked assembly and thus provide for better dimensional control in the finished assembly, the several items of each of the sets of components used in making up a number of stacks are further subdivided into two dimensional groups. The end plates 31 and 33 with larger holes 53 are used with those fuel rods 35 which have the larger external diameter, and a similar selective assembly was applied to the smaller size fuel rods 35 and end plates 31 and 33 with holes 53 in the smaller size range.

TACK WELDING AND ASSEMBLY

Important aids for dimensional control discovered in the manufacturing process are the tack-welding sequence shown in FIG. 5 and the use of spacers 55 through 65 of titanium-killed (Ti-Namel) steel to position the fuel rods 35 accurately. The sequence of assembly operations is shown pictorially in FIGS. 9, 10, 11.

According to studies of a number of stacks, the particular tack-welding sequence disclosed provides the least variation in weld shrinkage and distortion in the final product.

The spacers 55 through 65 are particularly advantageous both in the assembly operation and in controlling dimensions in subsequent processing of the assembly. In this latter instance, the spacers act as stops between adjacent fuel rods 35, beyond which they cannot close. It was found by a statistical analysis of the spacings between fuel rods 35 that in any one assembly or stack there is ordinarily a slightly non normal distribution. There is considerably less scattering of values on the lower side of the spacing range than on the high side.

FUSION WELDING CHAMBER

Figure 12:
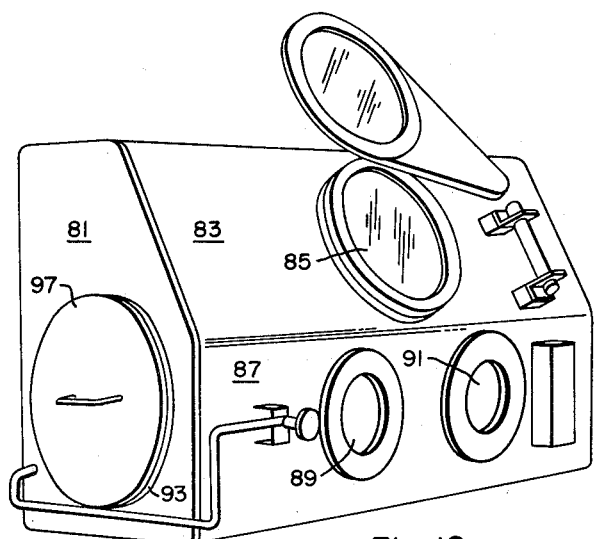
FIG. 12 is a view in perspective of a welding box used in the practice of this invention.

It is necessary to weld the rod end-plate assemblies in highly pure inert gas, but none of the weld chambers available prior to the manufacture of the fuel assemblies discussed here appeared to be entirely suitable for this particular welding application. A new chamber 81 was provided as shown in FIGS. 12 and 13. This chamber 81 is on the whole similar to that disclosed in Kramer et al. application Serial No. 500,354, but includes the following important features.

(1) *A cooling coil.*—The purpose of this coil 171 is to extract welding heat from the chamber so that a large number of welds can be made without stopping for cooling. Although the volume of the chamber 81 is relatively small compared to the work load anticipated for a single pump-down (evacuation), it was found that at least 480 to 600 welds (4 to 5 assembly ends) can be welded during a single pump-down without stopping for cooling periods.

The cooling assembly is shown in FIG. 13. It includes a copper pipe (in actual practice about 3½ inches in diameter) inserted into the side of the welding chamber 81 and extending above the welding electrode 101. The pipe has fins 173 brazed to its exterior surface as shown in FIG. 13. On the interior of the pipe, which is open at one end to the external atmosphere, there is a coil of tightly wound copper tubing (in actual practice about ⅜" diameter) which carries the cooling water. This coolant is kept flowing during the entire welding operation.

(2) *Work indexing mechanism.*—It is necessary for welding to locate accurately the electrode 101 at each fuel-rod end as positioned in the end plate 31 or 33. Since the rods 35 are, in practice, arranged in square arrays that are reproducible among fuel assemblies, a positive stop locating method of indexing is used. The mechanism is a three-tier plate assembly as shown in FIG. 13 and schematically in FIG. 14. The movement of the assembly during welding is controlled manually by the operator through rubber gloves 91 sealed into the front of the weld chamber.

(3) *Weld electrode.*—Because of the relatively large diameter of the fuel rod cross section 51 (approximately .420 inch in actual practice) and because of the original requirement for weld penetration to the full thickness of the end plates 31, 33, it is necessary to weld with a rotating electrode 101. The welding arc is rotated in the proximity of the periphery of the fuel rod cross section 51. When the electrode 101 is held stationary at the center of the fuel rod end, weld penetration is considerably more inconsistent than with the method used. The electrode mechanism can be seen in FIGS. 13, 15 and 16.

In the practice of this invention, the weld penetration can be controlled between the limits of 30% and 80% of the end-plate thickness with an average end plate penetration of approximately 50% while still maintaining the required shrinkage distortion pattern.

The rotation of the electrode is effected by direct drive from a variable speed motor (not shown) external to the weld chamber 81. The diameter of rotation is controlled by an eccentric mounting 161 as shown in FIGS. 15 and 16.

It is within the scope of this invention to provide a drive with a commutating joint between the incoming lead and the top of the electrode.

FUSION WELD SEQUENCE

Figure 19:
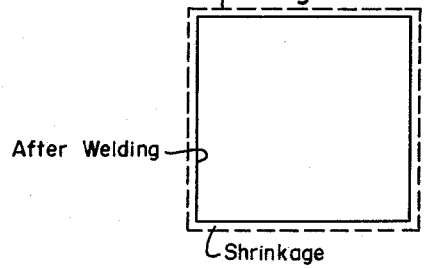

The welding sequence and establishment of welding parameters as related to the sequence are two of the most important features in controlling weld distortion and shrinkage and in maintaining the required spacing between adjacent fuel rods 35 in the assembly. It was found that different sequences result in varying amounts of distortion within the assembly and particularly cause the external periphery of the assembly to take on varying shapes. The effect of three sequences in this latter respect are shown schematically in FIGS. 17, 18 and 19. That shown in FIG. 19 is similar to the desirable one actually used in production. The actual sequence is presented in FIG. 6.

Actually the Ti-Namel steel spacers 55 through 65 between fuel rods 35 provided sufficient control to keep fuel rod spacing within the desired limits near the end plates 31 and 33 at the ends of the assembly. But, the weld shrinkage in each end plate exerts stresses on the ends of the fuel rods 35 and cause considerable longitudinal bowing of the rods 35 in the assembly and a resulting "barrelling" at the longitudinal center of the assembly. It was found that this effect could not be controlled sufficiently to achieve the highest precision by modification of the welding sequence. This also is the major reason for the relaxed dimensional tolerances at the center position of the fuel assembly as shown in FIG. 1. The barrelling condition, however, is brought under control during a subsequent vacuum annealing operation.

VACUUM ANNEALING

As indicated in the previous section, the vacuum annealing treatment is used primarily to control the welding distortion; however, a secondary beneficial effect achieved is that of eliminating the effects of surface contamination occasionally realized in the welding operation. When this contamination is not removed, it causes an unsatisfactory corrosion film to be formed during the corrosion test.

It was found that with the rod-stacks unrestrained the barrelling condition after welding becomes more prominent. The restraint is effected by external restraining clamps 181 around the periphery of the stack along its longitudinal midlength during the annealing operation. These clamps 181 distribute and partially eliminate the barrelling effect along the length of the fuel rods, and thus, provide rod spacings with less overall variation.

Since the Ti-Namel steel spacers 55 through 65 are required between fuel rods 35 during this annealing treatment, it is necessary to provide restraining clamps 181 which expand thermally to the same degree as the enclosed Zircaloy-2 alloy and Ti-Namel steel combination. A bimetallic clamp 181 of molybdenum and stainless steel is then used. The clamp is shown in FIG. 20 in component form and in FIG. 21 as positioned on the fuel assemblies. The combination of the aforementioned welding and tack welding sequences and the vacuum annealing practice is primarily responsible for maintaining the dimensional tolerances indicated in FIG. 1.

Remaining operations on fuel assemblies consist of machining and corrosion testing. Satisfactory corrosion resistance as indicated by visual inspection is evidence that the prior processing provided the desired quality in this respect.

We claim as our invention:

1. The method of precision welding a rod end-plate assembly comprising a plurality of rods engaging end plates at their ends into a stack comprising a plurality of rods sealed to end plates with the spacing between each rod and its adjacent rods being maintained along the whole lengths of said rods within narrow limits so that said stack maintains substantially its as-machined form, the said method comprising sealing said rods in a predetermined succession in which rods on the periphery of said stack and rods on the inside of said stack are sealed alternately to one of said end plates, by fusion-welding around the periphery of the end, in said one end plate, of each of said rods in its turn in said succession, and then sealing said rods in a succession homologous to said predetermined succession to said other end plate by fusion-welding around the periphery of the end, in said other end plate, of each of said rods in its turn in said homologous succession, said succession being such that said stack is formed with a minimum distortion.

Figure 6:
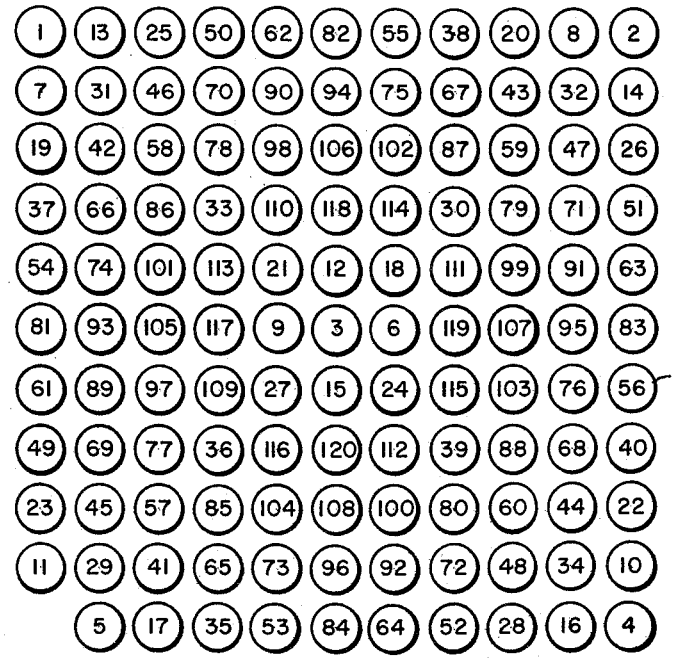
FIG. 6 is a diagram showing the welding succession used in the practice of this invention.

2. The method of precision welding a rod end-plate assembly comprising a plurality of rods engaging end plates at their ends into a stack comprising a plurality of rods sealed to end plates with the spacing between each rod and its adjacent rods being maintained along the whole lengths of said rods within narrow limits so that said stack maintains substantially its as-machined form, the said method comprising sealing said rods in a predetermined succession substantially as shown in FIG. 6 to one of said end plates, by fusion-welding around the periphery of the end, in said one end plate, of each of said rods in its turn in said succession, and then sealing said rods in a succession homologous to said predetermined succession to said other end plate by fusion-welding around the periphery of the end, in said other end plate, of each of said rods in its turn in said homologous succession, said succession being such that said stack is formed with a minimum distortion.

3. The method of sealing a stack of rods and an end plate, one of the ends of each of said rods engaging said end plate which comprises fusion-welding around the periphery of the end, in said end plate, of each of said rods in its turn in a predetermined succession in which said end-rods on the periphery of said stack and the ends of rods in the inside of said stack are sealed alternately such as to minimize distortion of the structure formed.

4. The method of producing a rigid assembly of a stack of rods and an end plate, one of the ends of each of said rods engaging said plate, said method comprising tack-welding said engaging ends of certain of said rods in a predetermined succession in which rods at spaced positions around the periphery of said stack are first tacked and thereafter rods generally along diagonals are tacked to said end plate, said succession being such as to minimize the distortion of said assembly.

5. The method of producing a rigid assembly of a stack of rods and an end plate, one of the ends of each of said rods engaging said plate, said method comprising tack-welding said engaging ends of certain of said rods in a predetermined succession substantially as shown in FIG. 5 to said end plate, said succession being such as to minimize the distortion of said assembly.

6. The method of suppressing cross-sectional distortion of a stack comprising an array of rods welded at their ends to end plates which comprises clamping said rods between said end plates by clamping means having a thermal coefficient of expansion about the same as the cross-sectional thermal expansion of said welded stack and annealing said stack while so clamped.

7. The method of precision welding a stack comprising a plurality of rods secured to end plates with the spacing between each rod and its adjacent rods being maintained along the whole lengths of said rods within narrow limits so that said stack maintains substantially its as-machined form, the said method comprising mounting said rods with each end of each rod engaging a corresponding opening in each of said end plates and with spacers interposed between each rod and its adjacent rods, tacking certain of said rods in a compensating succession such as to form a rigid rod-end-plate assembly, said rods having orders in said succession such that the tendency to distort by the tacking of each rod at least in part compensates for the tendency to distort by the tacking of rods tacked earlier in said succession and is at least in part compensated by the tendency to distort by the tacking of rods tacked later in said succession so as to minimize distortion of said assembly, and thereafter fusing said rods in a compensating succession to each of said plates, by fusion welding around the periphery of each rod, said last-named rods having orders in said succession such that the tendency to distort by the welding of each rod in said succession at least in part compensates for the tendency to distort by the welding of the rods welded earlier in said succession and is at least in part compensated by the tendency to distort by the welding of rods later in said succession so that said stack is formed with a minimum distortion.

8. The method of precision welding a stack comprising a plurality of rods secured to end plates with the spacing between each rod and its adjacent rods being maintained along the whole lengths of said rods within narrow limits so that said stack maintains substantially its as-machined form, the said method comprising mounting said rods with each end of each rod engaging a corresponding opening in each of said end plates, tacking certain of said rods in a compensating succession such as to form a rigid rod-and-plate assembly, said rods having orders in said succession such that the tendency to distort by the tacking of each rod tends to compensate at least in part for the tendency to distort by the tacking of the earlier rods and is at least in part compensated by the tendency to distort by the tacking of the later tacked rods so as to minimize distortion of said assembly, and thereafter fusing said rods in a compensating succession to each of said plates, by fusion welding around the periphery of each rod, said last-named rods having orders in said succession such that the tendency to distort by the welding of each rod in said succession at least in part compensates for the tendency to distort by the welding of the rods welded earlier in said succession and is at least in part compensated by the welding of the rods welded later in said succession so that said stack is formed with a minimum distortion.

9. The method of precision welding a stack comprising a plurality of rods secured to end plates with the spacing between each rod and its adjacent rods being maintained along the whole lengths of said rods within narrow limits so that said stack maintains substantially its as-machined form, the said method comprising mounting said rods with each end of each rod engaging a corresponding opening in each of said end plates, forming a rigid substantially undistorted rod-end-plate assembly by securing at least certain of said rods to said end plates, and thereafter fusing said rods in a compensating succession to each of said plates, by fusion welding around the periphery of each rod, said rods having orders in said succession such that the tendency to distort by the welding of each rod in said succession at least in part compensates for the tendency to distort by the welding of the rods welded earlier in said succession and is at least in part compensated by the welding of the rods welded later in said succession so that said stack is formed with a minimum distortion.

10. The method of precision welding a stack comprising a plurality of rods secured to end plates with the spacing between each rod and its adjacent rods being maintained along the whole lengths of said rods within narrow limits so that said stack maintains substantially its as-machined form, the said method comprising mounting said rods with each end of each rod engaging a corresponding opening in each of said end plates with the end surfaces of each end of each of said rods flush with the external surface of the end plate which it engages, forming a rigid substantially undistorted rod-end-plate assembly by securing at least certain of said rods to said end plates and thereafter fusing said rods in a compensating succession to each of said plates, by fusing welding around the periphery of each rod, said rods having orders in said succession such that the tendency to distort by the welding of each rod in said succession at least in part compensates for the tendency to distort by the welding of the rods welded earlier in said succession and is at least in part compensated by the welding of the rods welded later in said succession so that said stack is formed with a minimum distortion.

11. The method of precision welding a stack comprising a plurality of rods secured to end plates with the spacing between each rod and its adjacent rods being maintained along the whole lengths of said rods within narrow limits so that said stack maintains substantially its as-machined form, the said method comprising mounting said rods with each end of each rod engaging a corresponding opening in each of said end plates with the end surfaces of each end of each of said rods flush with the external surface of the end plate which it engages, forming a rigid substantially undistorted rod-end-plate assembly by securing at least certain of said rods to said end plates, and thereafter fusing said rods in a compensating succession to each of said plates, by arc fusing welding around the periphery of each rod with the welding arc within said periphery, said rods having orders in said succession such that the tendency to distort by the welding of each rod in said succession at least in part compensates for the tendency to distort by the welding of the rods welded earlier in said succession and is at least in part compensated by the welding of the rods welded later in said succession so that said stack is formed with a minimum distortion.

12. The method of precision welding a stack comprising a plurality of rods sealed to the end plates with the spacing between each rod and its adjacent rods being maintained along the whole lengths of said rods within narrow limits so that said stack maintains substantially its as-machined form, said method comprising mounting said rods with each end of each rod engaging a corresponding opening in each of said end plates, forming a rigid substantially undistorted rod-end-plate assembly by securing at least certain of said rods to said end plates, then fusing said rods in a first compensating succession to one of said end plates by fusion welding around the periphery of the end in said one end plate of each rod in its turn in the succession, and fusing said rods in a second compensating succession homologous to said first succession to said other end plate by fusion-welding around the periphery of the end in said other end plate of each of said rods in its turn in said last-named succession, said rods having orders in said succession such that the tendency to distort by the welding of each rod in said succession at least in part compensates for the tendency to distort by the welding of the rods welded earlier in said succession and is at least in part compensated by the welding of the rods welded later in said succession so that said stack is formed with a minimum distortion.

13. The method of producing a rigid undistorted rod-end-plate assembly preparatory to precision welding a stack comprising a plurality of said rods sealed to said end plates with the spacing between each rod and its adjacent rods being maintained along the whole lengths of said rods within narrow limits so that said stack maintains substantially its as-machined form, the said method comprising mounting said rods with each end of each rod engaging a corresponding opening in each of said end plates, tack welding the ends of at least certain of said rods in a first compensating succession to one of said end plates, and tack welding the other ends of at least certain of said rods in a second compensating succession homologous to said first succession to said other end plate, said rods having orders in said succession such that the tendency to distort by the tacking of each rod tends to compensate at least in part for the tendency to distort by the tacking of the earlier rods and is at least in part compensated by the tendency to distort by the tacking of the later tacked rods so as to minimize distortion and to maintain said rod-end-plate assembly in its as-machined condition.

14. The method of precision welding a rod-end-plate assembly comprising a plurality of rods engaging end plates at their ends into a stack comprising a plurality of rods sealed to end plates with the spacing between each rod and its adjacent rods being maintained along the whole lengths of said rods within narrow limits so that said stack maintains substantially its as-machined form, the said method comprising sealing said rods in a first compensating succession to one of said end plates, by fusion-welding around the periphery of the end, in said one end plate, of each of said rods in its turn in said succession, and then sealing said rods in a second compensating succession homologous to said first succession to said other end plate by fusion-welding around the periphery of the end, in said other end plate, of each of said rods in its turn in said homologous succession, said rods having orders in said succession such that the tendency to distort by the welding of each rod in said succession at least in part compensates for the tendency to distort by the welding of the rods welded earlier in said succession and is at least in part compensated by the welding of the rods welded later in said succession so that said stack is formed with a minimum distortion.

15. The method of sealing a stack of rods and an end plate, which comprises assembling said rods and said end plate in an assembly in which one of the ends of each of said rods engages said end plate, and fusion-welding around the periphery of the end, in said end plate, of each of said rods in its turn in a compensating succession, said rods having orders in said succession such that the tendency to distort by the welding of each rod in said succession at least in part compensates for the tendency to distort by the welding of the rods welded earlier in said succession and is at least in part compensated by the welding of the rods welded later in said succession so as to minimize distortion of the structure formed.

16. The method of sealing a stack of rods and an end plate, which comprises assembling said rods and said end plate in an assembly in which one of the ends of each of said rods engages said end plate and fusion-arc-welding around the periphery of the end, in said end plate, of each of said rods in its turn in a compensating succession, said rods having orders in said succession such that the tendency to distort by the welding of each rod in said succession at least in part compensates for the tendency to distort by the welding of the rods welded earlier in said succession and is at least in part compensated by the welding of the rods welded later in said succession so as to minimize distortion of the structure formed, the welding arc being maintained within the periphery of each end during the welding of said last-named end.

17. The method of producing a rigid assembly of a stack of rods and an end plate, which comprises assembling said rods and said end plate in an assembly in which one of the ends of each of said rods engages said plate, and tack-welding said engaging ends of certain of said rods in a compensating succession to said end plate, said rods having orders in said succession such that the tendency to distort by the tacking of each rod tends to compensate at least in part for the tendency to distort by the tacking of the earlier rods and is at least in part compensated by the tendency to distort by the tacking of the later tacked rods so as to minimize the distortion of said assembly.

18. The method of precision welding a rod-end-plate assembly comprising a plurality of rods engaging end plates at their ends into a stack comprising a plurality of rods sealed to end plates with the spacing between each rod and its adjacent rods being maintained along the whole lengths of said rods within narrow limits so that said stack maintains substantially its as-machined form, the said method comprising sealing said rods in a first compensating succession to one of said end plates, by fusion-welding around the periphery of the end, in said one end plate, of each of said rods in its turn in said succession, then sealing said rods in a second compensating succession homologous to said first succession to said other end plate by fusion-welding around the periphery of the end, in said other end plate, of each of said rods in its turn in said second succession, said rods having orders in said succession such that the tendency to distort by the welding of each rod in said succession at least in part compensates for the tendency to distort by the welding of the rods welded earlier in said succession and is at least in part compensated by the welding of the rods welded later in such succession so that said stack is formed with a minimum distortion, after said stack is welded clamping said stack between said end plates with clamping means having a thermal coefficient of expansion substantially the same as the cross-sectional expansion of said stack and annealing said stack while so clamped.

References Cited in the file of this patent
UNITED STATES PATENTS

| | | |
|---|---|---|
| 13,339 | Montgomery | July 24, 1855 |
| 508,881 | Hooven | Nov. 14, 1893 |
| 1,949,251 | Gilbert | Feb. 27, 1934 |
| 1,975,581 | Klein | Oct. 2, 1934 |
| 2,648,750 | Whitney | Aug. 11, 1953 |
| 2,787,700 | Kalbow | Apr. 2, 1957 |